J. H. ABBOTT.
DENTAL BRUSH.
APPLICATION FILED JULY 1, 1905.
912,051. Patented Feb. 9, 1909.
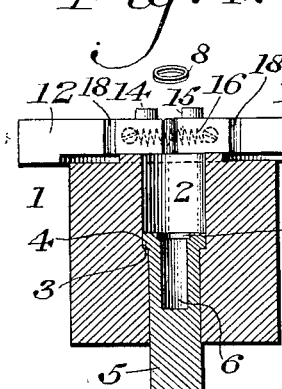
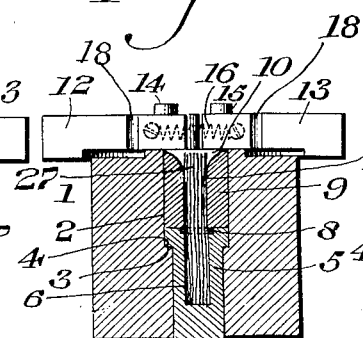
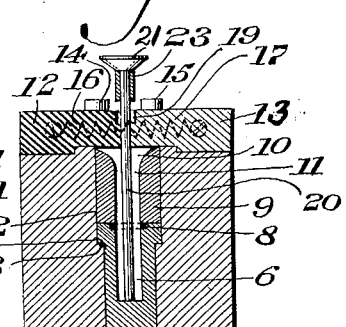
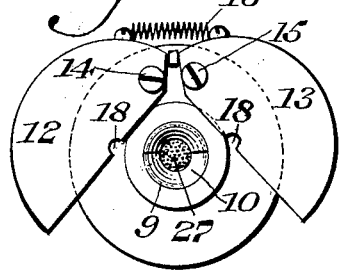
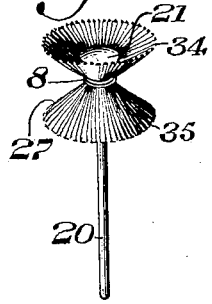
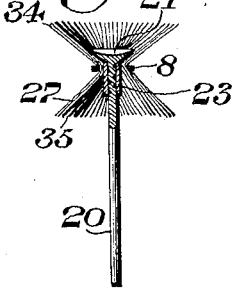
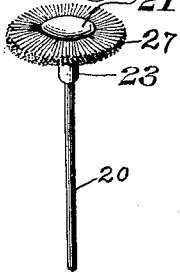
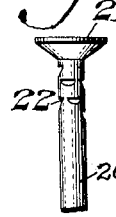
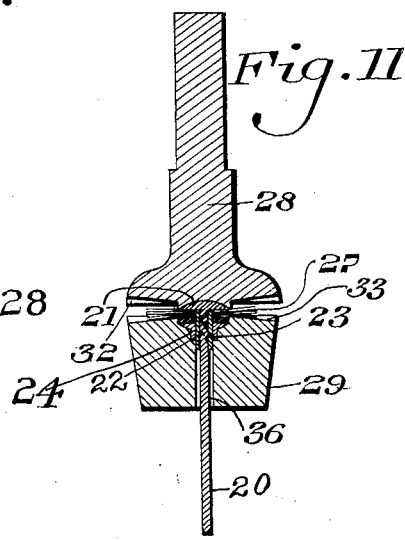
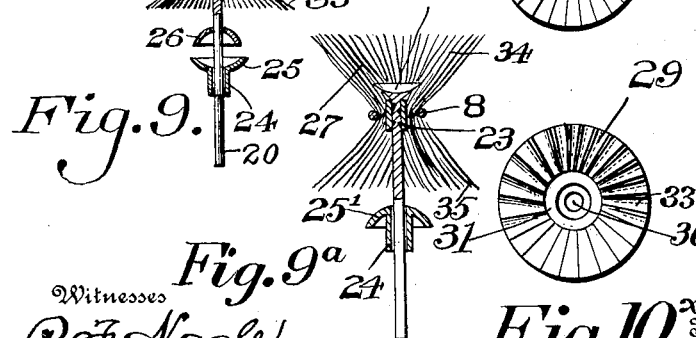
Witnesses
P. F. Nagle.
L. Douville.
Inventor
James Herman Abbott.
By Diedersheim & Fairbanks.
Attorneys

UNITED STATES PATENT OFFICE.

JAMES HERMAN ABBOTT, OF PHILADELPHIA, PENNSYLVANIA.

DENTAL BRUSH.

No. 912,051.  Specification of Letters Patent.  Patented Feb. 9, 1909.

Application filed July 1, 1905. Serial No. 267,873.

*To all whom it may concern:*

Be it known that I, JAMES HERMAN ABBOTT, a citizen of the United States, residing in the city and county of Philadelphia, State of Pennsylvania, have invented a new and useful Dental Brush, of which the following is a specification.

Proper regard to cleanliness and protection against the spread of contagious diseases demand the destruction of dental brushes after a single use.

The purpose of my invention is, to supply a brush which carries its own spindle and which is at the same time so inexpensive as not to invite repeated use upon different patients.

Figure 1 represents in perspective a complete brush. Fig. 2 represents in plan a frame for assembling the parts. Fig. 3 represents the frame of Fig. 2 in vertical section. Fig. 4 differs from Fig. 3 in omitting some of the parts. Fig. 5 illustrates the manner of inserting the spindle, the bristles being omitted. Fig. 6 represents in perspective and Fig. 7 in section the brush parts as they are removed from the assembling frame. Fig. 8 represents a spreader and ferrule used in the construction of the brush. Fig. 9 represents the brush parts shown in Figs. 6 and 7 with the addition of the spreader and ferrule of Fig. 8. Fig. 9ª represents a modification. Fig. 10 represents in bottom plan, the upper die, Fig. 10× in top plan, the lower die, and Fig. 11 in section, both of said dies, between which the parts shown in Fig. 9 are pressed to produce the finished brush. Fig. 12 represents the spindle and head in enlarged elevation. Fig. 13 represents in cross section a modified form of brush after it has been subjected to the action of the dies modified to suit the shape.

Similar numerals of reference indicate corresponding parts in the figures.

Referring to the drawings, 1 designates a frame or holder apertured at 2, the diameter of said aperture being reduced at 3 to form a shoulder 4 upon which rests a cup 5 having an aperture 6 enlarged at 7 to provide a seat for the ring 8. This cup is removable from the top of the holder, in which it is retained by the shoulder 4 from further movement downwardly than is shown in Fig. 4. Within the aperture 2 and above the cup is placed a split sleeve 9 having a tapered opening 10 corresponding in its smallest diameter at 11 to the diameter of the aperture 6. Upon the top of the holder are wings 12 and 13 pivoted at 14 and 15 respectively and held normally in open position by the spring 16, which may evidently be between them and press outwardly. When closed against the tension of the spring the wings form a cover 17 having an aperture 18 centrally disposed with reference to apertures 11 and 6. The upper part of the aperture 18 may be larger than the lower part as at 19, Fig. 5, for a purpose hereinafter specified.

The parts comprising the brush are spindle 20 having a preferably integral head 21 roughened in proximity to said head at 22, a sleeve 23 preferably of softer material than the adjoining parts, a sleeve 24 having a flange 25, washer, Fig. 5, or spreader 26 of metal, paper or any suitable material, the ring 8 and the bristles 27. The parts are assembled as follows:—With the frame and cup in the position shown in Fig. 5 and the wings drawn back from the center by the spring, the ring 8 is inserted within the space 7 and the split sleeve 9 is put in place. The bristles are now inserted being guided to place by the tapered opening of the split sleeve and having a length preferably corresponding to the distance between the bottom of the cup and the top of the split sleeve. It will be evident that the bristles are passed through the ring 8 in this manner and that the ring 8 is substantially centrally located thereon. The wings are then closed and the spindle, which has previously been passed through sleeve 23, is passed through the aperture 18, the sleeve resting, if the particular spindle used be short, in the larger portion 19 of said aperture, Fig. 5. It will be evident that the spindle is thus passed through substantially the center of the bristles. The leaves are then released, being withdrawn from the center by means of the spring 16 and the spindle carrying the bristles, sleeve and ring thereon is withdrawn from the frame, the split sleeve 9 being readily removed therefrom. The brush parts are then advanced upon the spindle to the position shown in Figs. 6 and 7. The spreader 26 and the flanged sleeve 24 are then placed upon the spindle in the order named. Whatever the intended shape of the finished brush the head and spreader are initially preferably convex toward the bristles in order that they may readily spread the bristles. The original shape of these parts as also of the flanged sleeve 24 is readily changed by the dies, although this sleeve may readily be flanged at the angle or in the shape finally intended. The brush is now ready to be placed between the dies by which the parts are pressed to place. Any suitable device may be used, it being evident that the ultimate shape of the head 21 and of the spreader 26 and flange 25 depend upon the shape of the meeting die members which are represented at 28 and 29 respectively. In the form shown the faces 30 and 31 of these die members are so formed as to result in substantially disk-shaped brushes having bristles in a radial plane. I form guide grooves 32 and 33 surrounding the operative die members for engagement with the ends 34 and 35 of the bristles in order to prevent undue tangential placing of these bristles during the setting of the parts under the dies and to secure as nearly as possible exact radial position for the bristles. It will be evident that this exact radial position although quite desirable is not necessary at all times for the reason that the tangential arrangement will result in opposite tangents upon the two edges 34 and 35 so that in whatever direction the brush is rotated there will be some bristles facing and some sloping away from the direction of rotation. In the lower die 29 I provide an aperture 36 in order that the spindle 20 may pass therethrough. The initial convexity of the head 21 and spreader 26 not only assists with the general spreading of the bristles but feeds them as it were into the grooves 32 and 33.

The spreader 26 is preferably of lighter and softer material than the flange 25 of the sleeve 24 in order that the shape of the spreader may be readily altered to agree with the shape of the flange upon the sleeve. It will be evident that the flange may be concave in the direction of the head of the spindle, as shown in the finished structure of Fig. 13 and that this concavity will overcome all initial convexity in that direction of the spreader and will result in a conical or curved form of brush, as shown in this figure. The flange 25 may evidently be shaped and used as a spreader in which case no separate spreader is necessary.

Fig. 9ª illustrates an initial shape 25' of the part 25 when it is used as a spreader, the separate spreader 26 being there omitted. It will be evident that the part 25 will be pressed to the ultimate shape required to retain the bristles against the particular shape of head 21 selected in order that the brush may have the desired form, in this case that shown in Fig. 13''.

While I have referred to the part 26 throughout the greater portion of my specification as a "spreader", it will be evident that this name properly belongs to it during the construction of the brush rather than upon the completion of the brush and that after performing its function as a spreader, it becomes in use a washer engaging with the bristles and retaining them upon the one side as it is pressed against them by the flange 25.

The sleeve 24 is of harder material than the sleeve 23, the result of which is that whereas the sleeve 24 could with difficulty be forced into such intimate contact with the roughened spindle 20 as to have its material embraced between the depressions where the spindle is roughened, it is very easily forced upon the sleeve 23 so as to compress this sleeve of softer material within the roughened portions 22 of the spindle 20 at the same time that a sufficiently tight friction joint is formed between the soft material of the sleeve 23 and the sleeve 24.

Having thus described my invention, what I claim as new and desire to secure by Letters Patent, is:—

1. In a device of the character described, a spindle having an integral head, a sleeve engaging the spindle, bristles and a flanged sleeve engaging said sleeve, and retaining the bristles between its flange and the head.

2. In a device of the character described, a spindle having an integral head and roughened in the vicinity of the head, a sleeve of softer material surrounding the spindle, a washer, a flanged sleeve making contact with the washer and engaging the first sleeve, and bristles retained between the washer and spindle head.

3. In a device of the character described, a spindle, a head secured thereto, a sleeve engaging the spindle, bristles surrounding the sleeve, a ring retaining the bristles in contact with the sleeve, a flanged sleeve engaging said sleeve and retaining the bristles between its flange and the head.

4. In a device of the character described, a spindle roughened near one extremity, a head thereon, a sleeve of softer material in intimate contact with the roughened portion of the spindle, bristles surrounding the sleeve, a ring retaining the bristles in contact with the sleeve and a flanged sleeve making contact with the sleeve of softer material and retaining the bristles between its flange and the head.

5. In a device of the character described, a headed spindle, a sleeve of softer material thereon, bristles surrounding the sleeve, a flanged sleeve making contact with the sleeve of softer material and retaining the bristles between its flange and the head.

6. In a device of the character described, a headed spindle roughened in proximity to the head, a sleeve of soft material in contact with said roughened portion, bristles surrounding the sleeve and a flanged sleeve contacting with the soft material and retaining the bristles between its flange and the head.

JAMES HERMAN ABBOTT.

Witnesses:
W. S. JACKSON,
C. D. McVAY.